United States Patent [19]

Hagger

[11] Patent Number: 4,617,422

[45] Date of Patent: Oct. 14, 1986

[54] ELECTRIC CABLES AND COMPOSITIONS FOR USE IN THEM

[75] Inventor: John M. R. Hagger, Twickenham, Great Britain

[73] Assignee: BICC Public Limited Company, London, England

[21] Appl. No.: 676,612

[22] Filed: Dec. 3, 1984

Related U.S. Application Data

[60] Division of Ser. No. 504,318, Jun. 14, 1983, abandoned, which is a continuation-in-part of Ser. No. 335,074, Dec. 28, 1981, abandoned.

[30] Foreign Application Priority Data

Jan. 30, 1981 [GB] United Kingdom ................. 8012849

[51] Int. Cl.$^4$ ............................................. H02G 15/20
[52] U.S. Cl. ................................... 174/23 C; 174/107; 523/173; 524/476; 524/490; 524/491
[58] Field of Search ...................... 174/23 C; 523/173; 524/476, 490, 491

[56] References Cited

U.S. PATENT DOCUMENTS

| | | | |
|---|---|---|---|
| 3,893,962 | 7/1975 | Walton et al. | 523/173 |
| 3,993,613 | 11/1976 | Doss et al. | 524/490 |
| 4,105,619 | 8/1978 | Kaufman et al. | 174/23 C |
| 4,176,240 | 11/1979 | Sabia | 174/23 C |
| 4,190,570 | 2/1980 | Kaufman et al. | 523/172 |
| 4,259,540 | 3/1981 | Sabia | 174/23 C |
| 4,324,453 | 4/1982 | Patel | 174/23 C |
| 4,356,342 | 10/1982 | Verne | 174/23 C |
| 4,361,507 | 11/1982 | Bourland | 174/23 C |
| 4,361,508 | 11/1982 | Bourland | 174/23 C |
| 4,497,538 | 2/1985 | Patel | 174/23 C |
| 4,509,821 | 4/1985 | Stenger | 174/23 C |
| 4,551,569 | 11/1985 | Verne | 174/23 C |

FOREIGN PATENT DOCUMENTS

| | | |
|---|---|---|
| 0001713 | 5/1979 | European Pat. Off. . |
| 2657280 | 7/1978 | Fed. Rep. of Germany . |
| 108853 | 5/1982 | Taiwan . |
| 2021612 | 12/1979 | United Kingdom . |

OTHER PUBLICATIONS

International Wire & Cable Symposium Proceedings, 1980, pp. 15–26, Mitchell et al.

*Primary Examiner*—Joseph L. Schofer
*Assistant Examiner*—N. Sarofim
*Attorney, Agent, or Firm*—Parkhurst & Oliff

[57] ABSTRACT

A low-tack, non-cell-filling filling medium for telecommunication cables comprises 70–98% liquid base, 1–15% of a block copolymer and 1–15% of a dispersed phase former. The base may consist of a hydrocarbon or hydrocarbon mixture whose molecules are substantially incapable of diffusing into polyethylene, polypropylene or (with or without wax) other cellular insulating material at temperatures of up to 80° C. or it may be a mixture of a mineral oil with a hydrocarbon or hydrocarbons satisfying the foregoing condition and also being soluble in the oil and having a low enough (number average) molecular weight to reduce significantly the osmotic pressure of the medium. The block copolymer includes at least one block tending to confer solubility in the base and at least one block tending to inhibit such solubility, so as to have a strong tendency to form a gel with the base. The dispersed phase former is a hydrocarbon material that is miscible with the medium at high temperatures but exists as solid dispersed particles at temperatures up to at least 65° C.

10 Claims, No Drawings

ELECTRIC CABLES AND COMPOSITIONS FOR USE IN THEM

RELATED APPLICATION

This is a division of application Ser. No. 504,318 filed June 14, 1983, now abandoned, which in turn is a continuation-in-part of Ser. No. 335,074, filed Dec. 28, 1981, now abandoned.

BACKGROUND OF THE INVENTION

This invention relates to fully-filled telecommunication cables and compositions for use as a filling medium in them. These cables comprise a multiplicity of conductors each with individual insulation, grouped in any appropriate way and enclosed in a sheath, the interstices between the insulated conductors, and between them and the sheath, being filled with a waterproof filling medium. The function of the filling medium is to provide a dielectric medium, the properties of which remain at the required level even when water gains access to the interstices. Furthermore the filling medium must inhibit the passage of water along the interstices in the event that the sheath or a joint enclosure is damaged when the cable is exposed to wet conditions, for instance while buried in the ground.

The insulation of the individual conductors of such cables is almost always of polyethylene or polypropylene (including certain of their semicrystalline thermoplastic copolymers of low permittivity), and in many cases this material is used in cellular form. To be effective the filling medium must be hydrophobic and highly deformable throughout the temperature range experienced by telecommunication cables in service (which can extend from $-40°$ C. to $+80°$ C.). It must also contact the insulation in such a way as to prevent passage of water between itself and the insulation. There are very few non-volatile materials that satisfy these requirements as well as the other important requirements of low permittivity and low dielectric loss, but for cables operating at temperatures up to about 50° C. hydrocarbon oils gelled with waxes (e.g. petroleum jellies) or hydrocarbon oils gelled with other suitable gelling agents have been found to be suitable.

It is however desirable to use fully-filled cables in some circumstances at temperatures up to about 80° C.—for example when they are associated with and run alongside large power cables—and in this case two difficulties arise. First, petroleum jelly shows a tendency to fill cells in the insulation to an extent that may be appreciable in a few months. This can result in partial loss of the medium from interstitial spaces in the cable leading to the development of longitudinal channels and the consequent impairment of the waterproofness of the cable; in addition, the displacement of air (permittivity approximately 1.0) in the cellular insulation by the filling medium (permittivity typically 2.3) will lead to changes in cable capacitance and hence transmission characteristics of the cable. Second, the viscosity of the medium decreases to the point at which it may flow along the interstices under the hydrostatic pressures that may occur in an installed cable, allowing the water to flow after it.

BACKGROUND OF THE INVENTION THE PRIOR ART

In European Patent Application Publication No. 0001713 published May 2, 1979 may colleague Verne has described a filling medium, and cables incorporating it, in which both of these problems have been overcome. The filling media there described, however, in common with conventional petroleum jelly based filling compounds, adhere tenaciously to insulation and require repeated mechanical wiping away from the insulation to prepare individual insulated wires for jointing and terminating purposes. The present invention defines a filling medium which is less tacky and more easily removed from the insulation and is generally more convenient to handle.

Other filling media that satisfy this desire are known from Sabia British Patent Application No. 2021612A published Dec. 5, 1979, but these are particularly unsatisfactory in their celling filling characteristics, even at relatively low temperatures and it is the object of the present invention to provide a filling medium (and cables incorporating it) that satisfies the requirement of effectively inhibiting cell filling in conjunction with that of the improved handling characteristics and which can be formulated for use at temperatures up to about 80° C. if required.

SUMMARY OF THE INVENTION

The filling medium in accordance with the invention is an admixture (without chemical reaction) comprising a liquid base, a block copolymer and a dispersed-phase former.

The liquid base forms 70–98% of the medium. It may consist solely of a hydrocarbon or hydrocarbon mixture whose molecules are substantially incapable of diffusing into polyethylene, polypropylene or other cellular insulating material at temperatures of up to 80° C.; alternatively it may be a mixture of up to 95% of a mineral oil with or without wax, for example in the form of petroleum jelly, with the balance being a hydrocarbon, or a mixture consisting essentially of hydrocarbons, whose molecules are substantially incapable of diffusing into polyethylene, polypropylene or other cellular insulating material at temperatures of up to 80° C. and which meets the additional requirements of being soluble in said mineral oil and having a low enough (number average) molecular weight to reduce significantly the osmotic pressure of the medium. It should be noted that the selection of hydrocarbons that satisfy these requirements (which are functions more of the size and shape of the molecules than of their chemical nature) is a key part of the invention.

The block copolymer is a solid and forms 1–15% of the medium. It comprises a main polymer chain, straight or branched, made up of repeating units of at least two kinds covalently bonded together, said repeating units being non-randomly distributed along the length of said chain in such a way as to divide said chain into at least two blocks, said blocks including at least one block tending to confer solubility in the liquid base and at least one block tending to inhibit such solubility, the proportions of the blocks being such that the polymer shows a strong tendency to form a gel with the base.

The dispersed phase former makes up 1–15% of the medium and is a hydrocarbon material that is miscible with the medium at high temperatures but exists as solid dispersed particles at temperatures up to at least 65° C.

In addition to the ingredients specified, the medium may include effective amounts of antioxidants and other stabilisers, including gel stabilisers.

PREFERRED FORMS OF THE INVENTION

The mineral oil (when used) has an aromatic content less than 15% or better not greater than 5%, ideally not greater than 2%. Typical materials meeting these requirements are White Technical Oils for example Puremor WOT45 sold by Burmah-Castrol Industrial Limited. Oils of high aromatic content can significantly alter the solubility characteristics of certain block copolymers and can also degrade dielectric properties of the filling medium in some cases.

One preferred group of liquids for use as the base, or when the base includes mineral oil as the other ingredient thereof, consists of commercially available liquids made by polymerisation to a low degree of a gaseous feed-stock consisting essentially of iso-butene (also known as iso-butylene). These liquids are referred to, somewhat inconsistently, as "polybutenes", and those with number average molcular weights between 200 and 4000, particularly those between 350 and 2500, and more particularly between 400 and 1500, are appropriate for the present purpose. Such liquid polybutenes are sold by BP Chemicals Limited, under the trade name Hyvis. As the molecular weight of the polybutene increases, the solubility and gel forming ability of the block copolymer is impaired and the resulting composition tends to become more tacky.

Another preferred group of substances for use with mineral oil as the other ingredient of the base consist of low molecular weight hydrocarbon resins, particularly those, said to be derived largely from alphamethylstyrene, sold by Hercules Powder Company under the trade name Kristalex and having ring-and-ball softening points (ASTM-E28) between 20° and 120° C. and more particularly between 60° and 100° C.

The block copolymer preferably forms 2–8% of the medium, and may be of various types, such as those designated "ABA", "ABAB", "ABCBA", "$A_nB$" and $(AB)_n$.

At least when the oil has an aromatic content less than 15%, a preferred block copolymer is a linear, three-block copolymer in which the center block comprises repeating units which can be regarded as ethylene and butylene randomly distributed within the block with neighboring units covalently bonded together, while end blocks consist essentially of styrene repeating units covalently bonded together and grafted on to the center block. A commercial material of this kind with a styrene to ethylene-butylene ratio of approximately 0.4, sold by Shell Chemicals Limited under the trade mark Kraton as Kraton G1650 or G1652 is especially preferred.

The high temperatures at which the dispersed phase former is miscible with the medium heat must include a temperature at which the medium can be introduced into the cable. The maximum level of this temperature will almost always be determined by the softening characteristics of the insulation of the cable in which the medium is used. For example, for the following commonly-used cellular insulating materials, the dispersed-phase former must be miscible with the medium down to the temperature indicated (at least):

medium density polyethylene—95 (preferably 90)°C.
high density polyethylene—105 (preferably 100)°C.
polypropylene—135 (preferably 130)°C.

For maximum versatility of use, it is preferable that this ingredient does not form solid dispersed particles until the temperature falls at least to 90° C., and preferably to 85° C.

Preferably there is at least 1.5%, and more especially 1.5–5%, of the dispersed phase former. This ingredient is preferably a low molecular-weight polyethylene with a ring-and-ball softening point (ASTM-E28) in the range 110°–130° C. Suitable ethylene homopolymers are sold by Allied Chemical, for example grade AC 8 which has a ring-and-ball softening point (ASTM-E28) of 116° C. and a viscosity (Brookfield-LVT at 140° C.) of 350 cP.

A preferred gel stabiliser is the "synthetic isopropylated phenyl orthophosphate" sold by Ciba-Geigy Limited under the trade mark "Reofos" as Reofos 95. Alternatives can be selected from among other phosphate esters, alkyl ether phosphates, di(alkyl ether)esters, di- and poly-(alkylene oxy)glycol diesters, alkyl-alkyl ether diesters, alkyl ether monoesters and aromatic diesters.

Conventional antioxidants can be used in appropriate amounts, a suitable example being 0.5–1% of the material sold by Vulnax International Limited under the trade mark Permanax as Permanax WSP.

Other stabiliser additives, such as metal deactivators, flame retardants, can be added as appropriate.

DETAILED DESCRIPTION

The following tables show the compositions of various examples of filling media in accordance with the invention (Examples 1–28) together with some other media (Examples A–D) for comparison purposes. Properties are reported for selected examples. More specifically Examples 1–18 (Tables 1–3) illustrate the use of various commercially available ingredients to control cell-filling tendency; Examples 19–23 (and Example 6 repeated for ease of comparison) (Table 4) illustrate how the content of the block copolymer and the dispersed phase former may be varied to control viscosity (cell-filling tendency in all these examples being at an insignificant level); Examples 6 (repeated again) and 24–26 (Table 5) illustrate how tackiness can be controlled by varying the ratio of the dispersed phase former to the block copolymer; and Examples 27–28 (Table 6) are formulated to have a specially low viscosity to suit particular existing applicator plant.

Examples A–D are also included in Table 6; the exact compositions of Examples B, D and D are not known; they are commercially available materials as follows:

Example B: Penreco FW—Non-petrolatum based cable filling compound sold by Penreco Inc. of Butler, Pa., U.S.A.

Example C: Silkolene 947—Petroleum jelly compound sold by Dalton & Company Limited, of Belper, Derbyshire, United Kingdom.

Example D: Insojell 3332—High temperature petroleum jelly compund sold by Dussek Campbell Limited, of Crayford, Kent, United Kingdom.

TABLE 1

| | Example: | | | | | |
|---|---|---|---|---|---|---|
| | 1 | 2 | 3 | 4 | 5 | 6 |
| COMPOSITION | | | | | | |
| White Technical Oil (Puremore WOT 45) | 80 | 70 | 60 | 85 | 80 | 70 |
| Polybutene | | | | | | |
| Hyvis 200 (number average molecular weight 2400) | 10 | 20 | 30 | | | |
| Hyvis 10 (number average molecular weight 1000) | | | | 5 | 10 | 20 |

TABLE 1-continued

|  | Example: | | | | | |
|---|---|---|---|---|---|---|
|  | 1 | 2 | 3 | 4 | 5 | 6 |
| Hyvis 3 (number average molecular weight 650) | | | | | | |
| Hyvis 07 (number average molecular weight 440) | | | | | | |
| Hyvis 03 (number average molecular weight 250) | | | | | | |
| Hydrocarbon Resin: | | | | | | |
| Kristalex F 85 | | | | | | |
| Kristalex 3025 | | | | | | |
| Block Copolymer: (Kraton G1652) | 6 | 6 | 6 | 6 | 6 | 6 |
| Polyethylene (AC8) | 4 | 4 | 4 | 4 | 4 | 4 |
| PROPERTIES | | | | | | |
| Cell filling (at 70° C.): % mass increase | | | | | | |
| 5 weeks | | 8.4 | | 14.1 | 11.6 | 10.2 |
| 10 weeks | | 8.8 | | 15.6 | 12.0 | 10.3 |
| % increase in density | | | | | | |
| 5 weeks | | 0.0 | | 4.5 | 2.4 | 0.6 |
| 10 weeks | | 0.1 | | 5.0 | 2.7 | 0 |
| % air replacement | | | | | | |
| 5 weeks | | 0 | | 9.4 | 3.6 | 0 |
| 10 weeks | | 0 | | 10.5 | 4.4 | 0 |
| Drop Point (°C.) (IP31/66) | 77 | 85 | 88 | 73 | 74 | 76 |
| Drainage Test at 70° C. (passes in 3) | | 3 | | | | 3 |
| Viscosity (P) at 90° C. | | | | | | |
| 11.8 s$^{-1}$ | | 27.5 | | | 11.0 | 17.7 |
| 125.4 s$^{-1}$ | | 16.5 | | | 8.3 | 9.7 |
| Finger test | B | D | E | B | B | B |

TABLE 2

|  | Example: | | | | | |
|---|---|---|---|---|---|---|
|  | 7 | 8 | 9 | 10 | 11 | 12 |
| COMPOSITION | | | | | | |
| White Technical Oil (Puremore WOT 45) | 50 | 70 | 70 | 70 | 50 | 30 |
| Polybutene | | | | | | |
| Hyvis 200 (number average molecular weight 2400) | | | | | | |
| Hyvis 10 (number average molecular weight 1000) | 40 | | | | | |
| Hyvis 3 (number average molecular weight 650) | | 20 | | | | |
| Hyvis 07 (number average molecular weight 440) | | | 20 | | | |
| Hyvis 03 (number average molecular weight 250) | | | | 20 | 40 | 60 |
| Hydrocarbon Resin: | | | | | | |
| Kristalex F 85 | | | | | | |
| Kristalex 3025 | | | | | | |
| Block Copolymer: (Kraton G1652) | 6 | 6 | 6 | 6 | 6 | 6 |
| Polyethylene (AC8) | 4 | 4 | 4 | 4 | 4 | 4 |
| PROPERTIES | | | | | | |
| Cell filling (at 70° C.): % mass increase | | | | | | |
| 5 weeks | | 12.2 | 17.4 | 30.7 | | 16.6 |
| 10 weeks | | 13.1 | 21.7 | 39.3 | | |
| % increase in density | | | | | | |
| 5 weeks | | 2.4 | 6.9 | 18.7 | | 4.8 |
| 10 weeks | | 2.8 | 9.5 | 24.4 | | |
| % air replacement | | | | | | |
| 5 weeks | | 3.3 | 15.9 | 44.1 | | 10.0 |
| 10 weeks | | 4.4 | 22.0 | 63.7 | | |
| Drop Point (°C.) (IP31/66) | 85 | 73 | 70 | 64 | 55 | 52 |
| Drainage Test at 70° C. (passes in 3) | | | | 2 | | |
| Viscosity (P) at 90° C. | | | | | | |
| 11.8 s$^{-1}$ | | | | 3.5 | | |
| 125.4 s$^{-1}$ | | | | 1.6 | | |
| Finger test | C | B | B | A | B | B |

TABLE 3

|  | Example: | | | | | |
|---|---|---|---|---|---|---|
|  | 13 | 14 | 15 | 16 | 17 | 18 |
| COMPOSITION | | | | | | |
| White Technical Oil (Puremore WOT 45) | | 80 | 70 | 70 | 70 | 60 |
| Polybutene - | | | | | | |
| Hyvis 200 (number average molecular weight 2400) | | | | | | |
| Hyvis 10 (number average molecular weight 1000) | | | | | 10 | 10 |
| Hyvis 3 (number average molecular weight 650) | | | | | | |
| Hyvis 07 (number average molecular weight 440) | | | | | | |
| Hyvis 03 (number average molecular weight 250) | 90 | | | | | |
| Hydrocarbon Resin: | | | | | | |
| Kristalex F 85 | | 10 | 20 | | 10 | 20 |
| Kristalex 3025 | | | | 20 | | |
| Block Copolymer: (Kraton G1652) | 6 | 6 | 6 | 6 | 6 | 6 |
| Polyethylene (AC8) | 4 | 4 | 4 | 4 | 4 | 4 |
| PROPERTIES | | | | | | |
| Cell filling (at 70° C.): % mass increase | | | | | | |
| 5 weeks | 24.5 | 18.9 | 11.5 | 14.9 | 10.7 | 11.1 |
| 10 weeks | 32.2 | | 12.4 | 17.8 | 12.9 | 10.2 |
| % increase in density | | | | | | |
| 5 weeks | 9.3 | 7.3 | 2.1 | 4.7 | 0 | 1.2 |
| 10 weeks | 14.4 | | 2.8 | 7.8 | 1.9 | 0.3 |
| % air replacement | | | | | | |
| 5 weeks | 20.4 | 16.4 | 3.1 | 9.8 | 0 | 0.9 |
| 10 weeks | 42.2 | | 4.6 | 9.3 | 2.2 | 0 |
| Drop Point (°C.) (IP31/66) | 36 | 67 | 66 | 58 | 70 | 71 |
| Drainage Test at 70° C. (passes in 3) | | 3 | 3 | | | |
| Viscosity (P) at 90° C. | | | | | | |
| 11.8 s$^{-1}$ | | | 5.0 | | 8.3 | 8.5 |
| 125.4 s$^{-1}$ | | | 3.3 | | 7.8 | 7.8 |
| Finger test | A | A | B | A | B | B |

TABLE 4

|  | Example: | | | | | |
|---|---|---|---|---|---|---|
|  | 19 | 20 | 6 | 21 | 22 | 23 |
| COMPOSITION | | | | | | |
| White Technical Oil (Puremore WOT 45) | 70 | 70 | 70 | 70 | 70 | 70 |
| Polybutene | | | | | | |
| Hyvis 200 (number average molecular weight 2400) | | | | | | |
| Hyvis 10 (number average molecular weight 1000) | 20 | 20 | 20 | 20 | 20 | 20 |
| Hyvis 3 (number average molecular weight 650) | | | | | | |
| Hyvis 07 (number average molecular weight 440) | | | | | | |
| Hyvis 03 (number average molecular weight 250) | | | | | | |
| Hydrocarbon Resin: | | | | | | |
| Kristalex F 85 | | | | | | |
| Kristalex 3025 | | | | | | |
| Block Copolymer: (Kraton G1652) | 10 | 8 | 6 | 4 | 2 | — |
| Polyethylene (AC8) | — | 2 | 4 | 6 | 8 | 10 |
| PROPERTIES | | | | | | |
| Cell filling (at 70° C.): % mass increase | | | | | | |
| 5 weeks | | | | | | |
| 10 weeks | | | | | | |
| % increase in density | | | | | | |
| 5 weeks | | | | | | |
| 10 weeks | | | | | | |

TABLE 4-continued

|  | Example: | | | | | |
|---|---|---|---|---|---|---|
|  | 19 | 20 | 6 | 21 | 22 | 23 |
| % air replacement | | | | | | |
| 5 weeks | | | | | | |
| 10 weeks | | | | | | |
| Drop Point (°C.) (IP31/66) | 82 | 79 | 76 | 76 | 74 | 79 |
| Drainage Test at 70° C. (passes in 3) | 0 | 3 | 3 | 3 | 3 | 3 |
| Viscosity (P) at 90° C. | | | | | | |
| 11.8 s$^{-1}$ | >50 | 48 | 17.7 | 6.5 | 4.3 | 2.2 |
| 125.4 s$^{-1}$ | 40 | 27 | 9.7 | 4.5 | 2.2 | 1.1 |
| Finger test | A | B | B | D | E | E |

TABLE 5

|  | Example: | | | |
|---|---|---|---|---|
|  | 6 | 24 | 25 | 26 |
| COMPOSITION | | | | |
| White Technical Oil (Puremore WOT 45) | 70 | 72.5 | 75 | 77.5 |
| Polybutene | | | | |
| Hyvis 200 (number average molecular weight 2400) | | | | |
| Hyvis 10 (number average molecular weight 1000) | 20 | 20 | 20 | 20 |
| Hyvis 3 (number average molecular weight 650) | | | | |
| Hyvis 07 (number average molecular weight 440) | | | | |
| Hyvis 03 (number average molecular weight 250) | | | | |
| Hydrocarbon Resin: | | | | |
| Kristalex F 85 | | | | |
| Kristalex 3025 | | | | |
| Block Copolymer: (Kraton G1652) | 6 | 4.5 | 3 | 1.5 |
| Polyethylene (AC8) | 4 | 3 | 2 | 1 |
| PROPERTIES | | | | |
| Cell filling (at 70° C.): | | | | |
| % mass increase | | | | |
| 5 weeks | | | | |
| 10 weeks | | | | |
| % increase in density | | | | |
| 5 weeks | | | | |
| 10 weeks | | | | |
| % air replacement | | | | |
| 5 weeks | | | | |
| 10 weeks | | | | |
| Drop Point (°C.) (IP31/66) | 76 | 70 | 62 | 53 |
| Drainage Test at 70° C. (passes in 3) | 3 | 3 | 0 | 0 |
| Viscosity (P) at 90° C. | | | | |
| 11.8 s$^{-1}$ | 17.7 | 3.5 | 0.8 | <0.5 |
| 125.4 s$^{-1}$ | 9.7 | 3.3 | 0.8 | <0.5 |
| Finger test | B | C | E | E |

TABLE 6

|  | Example: | | | | | |
|---|---|---|---|---|---|---|
|  | 27 | 28 | A | B | C | D |
| COMPOSITION | | | | | | |
| White Technical Oil (Puremore WOT 45) | 72.5 | 70.5 | 90 | | SEE TEXT | |
| Polybutene | | | | | | |
| Hyvis 200 (number average molecular weight 2400) | | | | | | |
| Hyvis 10 (number average molecular weight 1000) | 10 | 10 | | | | |
| Hyvis 3 (number average molecular weight 650) | | | | | | |
| Hyvis 07 (number average molecular weight 440) | | | | | | |
| Hyvis 03 (number average molecular weight 250) | | | | | | |
| Hydrocarbon Resin: | | | | | | |
| Kristalex F 85 | 10 | 13 | | | | |
| Kristalex 3025 | | | | | | |
| Block Copolymer: (Kraton G1652) | 4.5 | 4.5 | 6 | | | |
| Polyethylene (AC8) | 3 | 2 | 4 | | | |
| PROPERTIES | | | | | | |
| Cell filling (at 70° C.): | | | | | | |
| % mass increase | | | | | | |
| 5 weeks | | 10.6 | 28.4 | 31.4 | 28.5 | 24.1 |
| 10 weeks | | — | 32.5 | 36.3 | 48.6 | 29.1◨ |
| % increase in density | | | | | | |
| 5 weeks | | 1.4 | 16.3 | 21.5 | 6.5 | 2.9 |
| 10 weeks | | — | 19.8 | 22.2 | 14.7 | 7.1 |
| % air replacement | | | | | | |
| 5 weeks | | 1.6 | 37.4 | 47.7 | 14.0 | 5.3 |
| 10 weeks | | — | 48.4 | 55.8 | 47.5 | 15.2 |
| Drop Point (°C.) (IP31/66) | 70 | 71 | 71 | 60 | 75 | 85 |
| Drainage Test at 70° C. (passes in 3) | 3 | 0* | 3 | 3 | 0 | 3 |
| Viscosity (P) at 90° C. | | | | | | |
| 11.8 s$^{-1}$ | 2.0 | 1.1 | 6.4 | 1.3 | <1 | 2.3 |
| 125.4 s$^{-1}$ | 1.6 | 0.9 | 5.2 | 0.9 | <1 | 1.0 |
| Finger test | C | B | B | C | E | E |

*but rates 3 at 65° C.
◨20 weeks

Properties reported in the table were tested as follows:

1. Cell Filling

Based on weighing in air and water samples of insulated conductor, as described by S. M. Beach, K. R. Bullock and D. F. Cretney, 'Cellular Polyethylene Insulated Filled Communication Cable and its Increasing Use', 24th Wire & Cable Symposium, 1975. The samples used in these tests were of copper wire, 0.5 mm in diameter, covered with 0.2 mm radial thickness of an expanded medium-density polyethylene; the polyethylene was supplied by BXL Plastics Limited under the reference BXL PN 225/6 and the degree of expansion was 30%. Note that, because of thermal annealing effects, density increases below 1% do not imply any cell filling.

2. Drop Point

By Institute of Petroleum test IP31/66.

3. Drainage

Three samples of polyethylene tube, each 150 mm long, 3 mm bore and 1.5 mm wall thickness, were filled with the medium to be tested, using a syringe and if necessary softening the medium by heating. The tube ends were both open throughout the test. Filled tubes were suspended vertically in an air oven at 70° C. for 24 hours. No visible drainage is allowable.

4. Viscosity

Measured with the Ferranti Portable Viscometer, Model VM, at the shear rates of 11.8 and 125.4 s$^{-1}$ as indicated.

5. Finger Test

A subjective test of handling properties based on squeezing a ball of the medium between thumb and finger and rating on the scale:

A—cohesive enough to stick to only one of thumb and finger and leaving no appreciable oil residue on the other.
B—cohesive but very slight oil residue left
C—cohesive but slight oil residue left
D—leaves substantial oil residue and/or is not cohesive enough to avoid risk of leaving some residue of medium
E—cohesion so low that medium sticks to both thumb and finger

What I claim as my invention is:

1. A fully-filled telecommuncation cable comprising a plurality of metallic conductors each coated with cellular insulation and a sheath enclosing said conductors and containing a filling medium comprising (by weight):
   (a) 70-98% of a hydrocarbon base comprising:
      (i) a first component which is selected from the group consisting of mineral oils, petroleum jellies and mixtures of mineral oil with wax;
      (ii) a second component which is soluble in the first component and which comprises at least one hydrocarbon whose molecules are substantially incapable of diffusing into polyethylene, polypropylene and other cellular insulating material at temperatures of up to 80° C., its number average molecular weight being low enough and its quantity sufficient to establish an osmotic pressure relative to that of the first component as solvent, which is effective to inhibit migration of said first component into cells of said cellular insulation;
   (b) 1-15% of a block copolymer which comprises a main polymer chain made up of repeating units of at least two kinds covalently bonded together, said repeating units being non-randomly distributed along the length of said chain in such a way as to divide said chain into at least one block tending to confer solubility in the base and at least one block tending to inhibit such solubility, the proportions of the blocks being such that the polymer forms a gel with the base; and
   (c) 1-15% of a hydrocarbon material that is miscible with said base and said block copolymer above 135° C. but forms solid dispersed particles at a temperature not lower than 65° C.

2. A cable as in claim 1, wherein said second component of the base comprises a liquid polybutene with a number average molecular weight between 200 and 4000.

3. A cable as in claim 1, wherein said second component of the base comprises a low molecular weight hydrocarbon resin.

4. A cable as in claim 1, wherein said mineral oil has an aromatic content less than 15%.

5. A cable as in claim 1, wherein said ingredient (b) is a block copolymer of the ABA type in which the center block (B) is a random copolymer of ethylene and butylene with end blocks (A) formed by graft polymerization of styrene on to the center block.

6. A cable as in claim 1, wherein said filling medium contains 1.5 to 5% of ingredient (c).

7. A fully-filled telecommunication cable comprising a plurality of metallic conductors each coated with cellular insulation and a sheath enclosing said conductors and containing a filling medium comprising (by weight):
   (a) 70-98% of a liquid polybutene with a number average molecular weight between 200 and 4000;
   (b) 1-15% of a block copolymer which comprises a main polymer chain made up of repeating units of at least two kinds covalently bonded together, said repeating units being nonrandomly distributed along the length of said chain in such a way as to divide said chain into at least one block tending to confer solubility in the base and at least one block tending to inhibit such solubility, the proportions of the blocks being such that the polymer forms a gel with the base; and
   (c) 1-15% of a hydrocarbon material that is miscible with said polybutene and said block copolymer above 135° C. but forms solid dispersed particles at a temperature not lower than 65° C.

8. A cable as in claim 7, further comprising a low molecular weight hydrocarbon resin.

9. A cable as in claim 7, wherein said ingredient (b) is a block copolymer of the ABA type in which the center block (B) is a random copolymer of ethylene and butylene with end blocks (A) formed by graft polymerization of styrene on to the center block.

10. A cable as in claim 7, wherein said filling medium contains 1.5 to 5% of ingredient (c).

* * * * *